Oct. 16, 1962   C. J. CHEBUHAR ETAL   3,058,512
BODY BLANK FLANGING MECHANISM
Filed Feb. 20, 1957   10 Sheets-Sheet 1
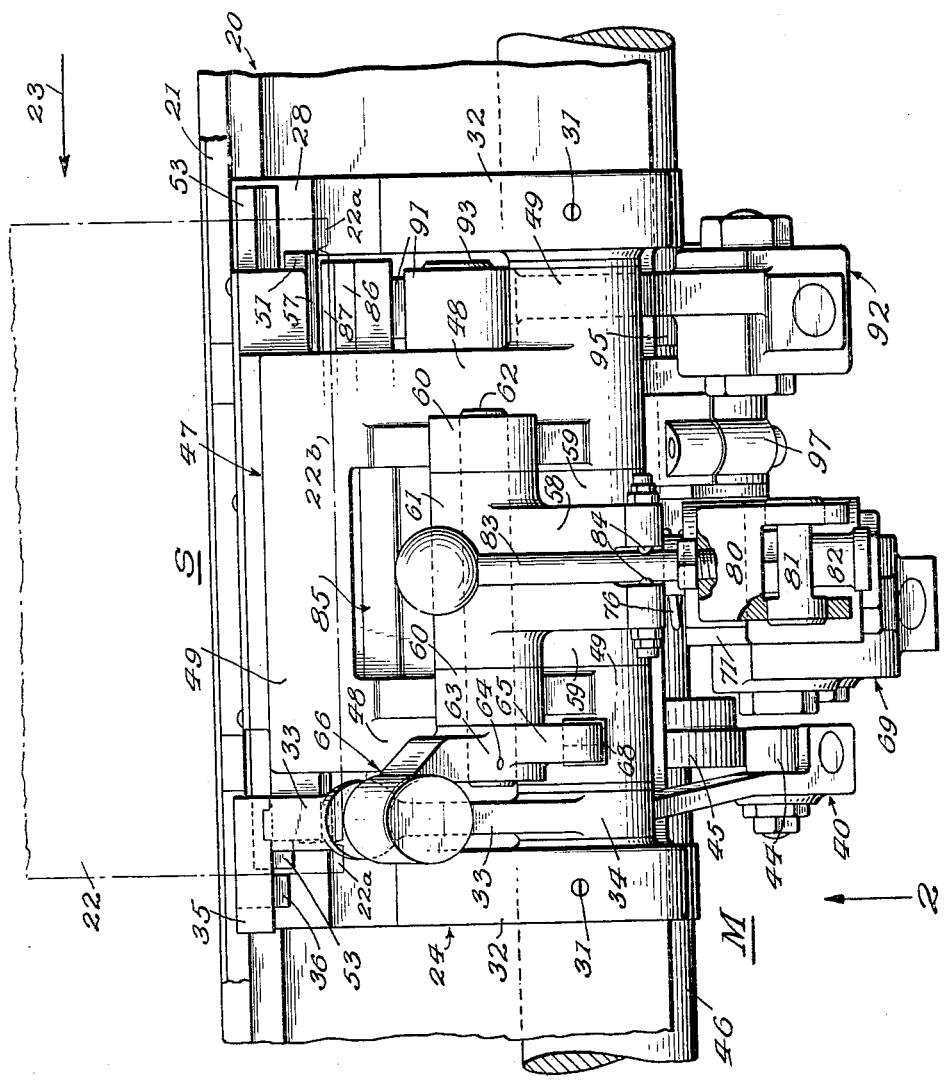
INVENTORS
Charles J. Chebuhar and
Paul E. Pearson
BY
Mason, Porter, Diller & Stewart
ATTORNEYS

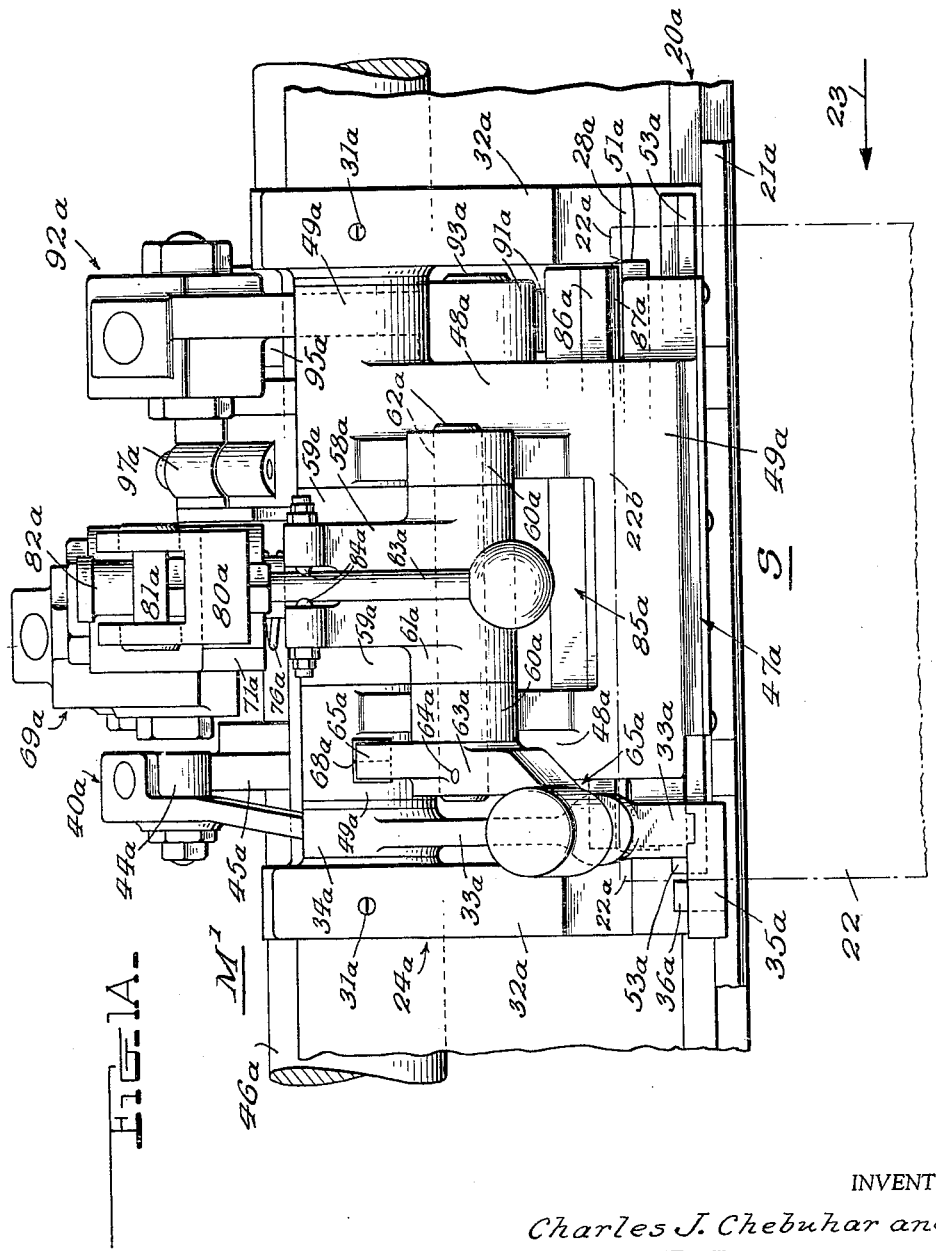

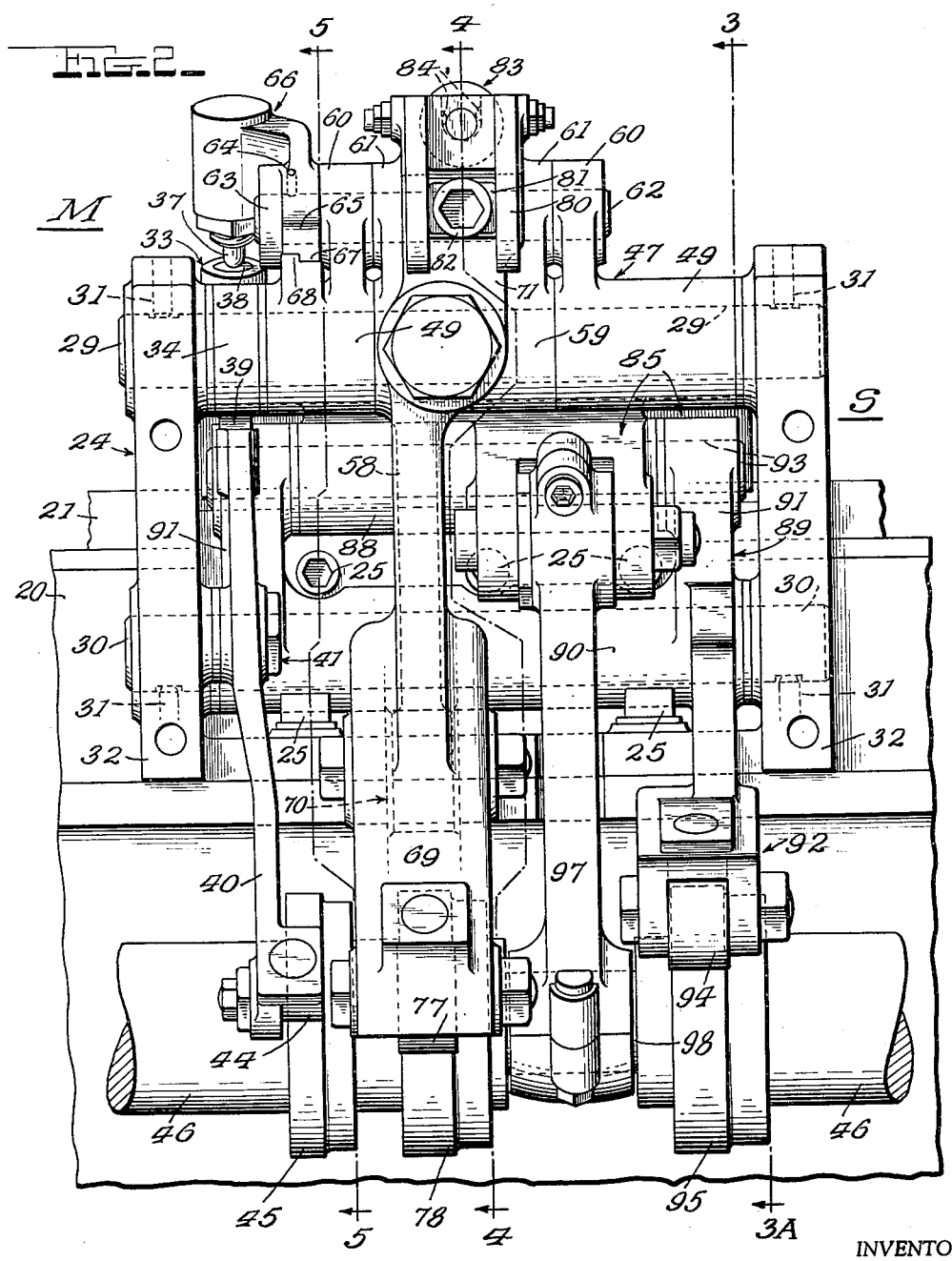

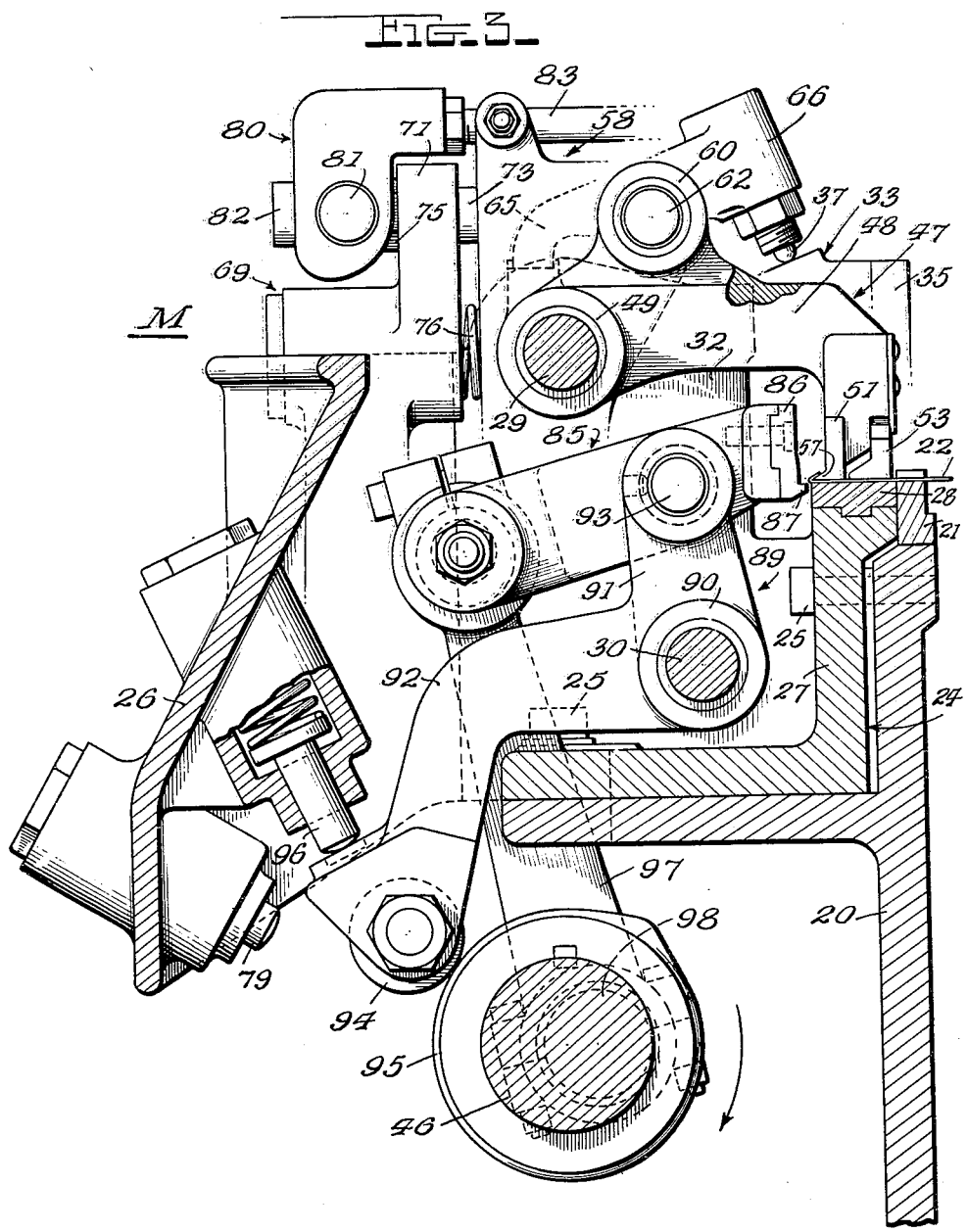

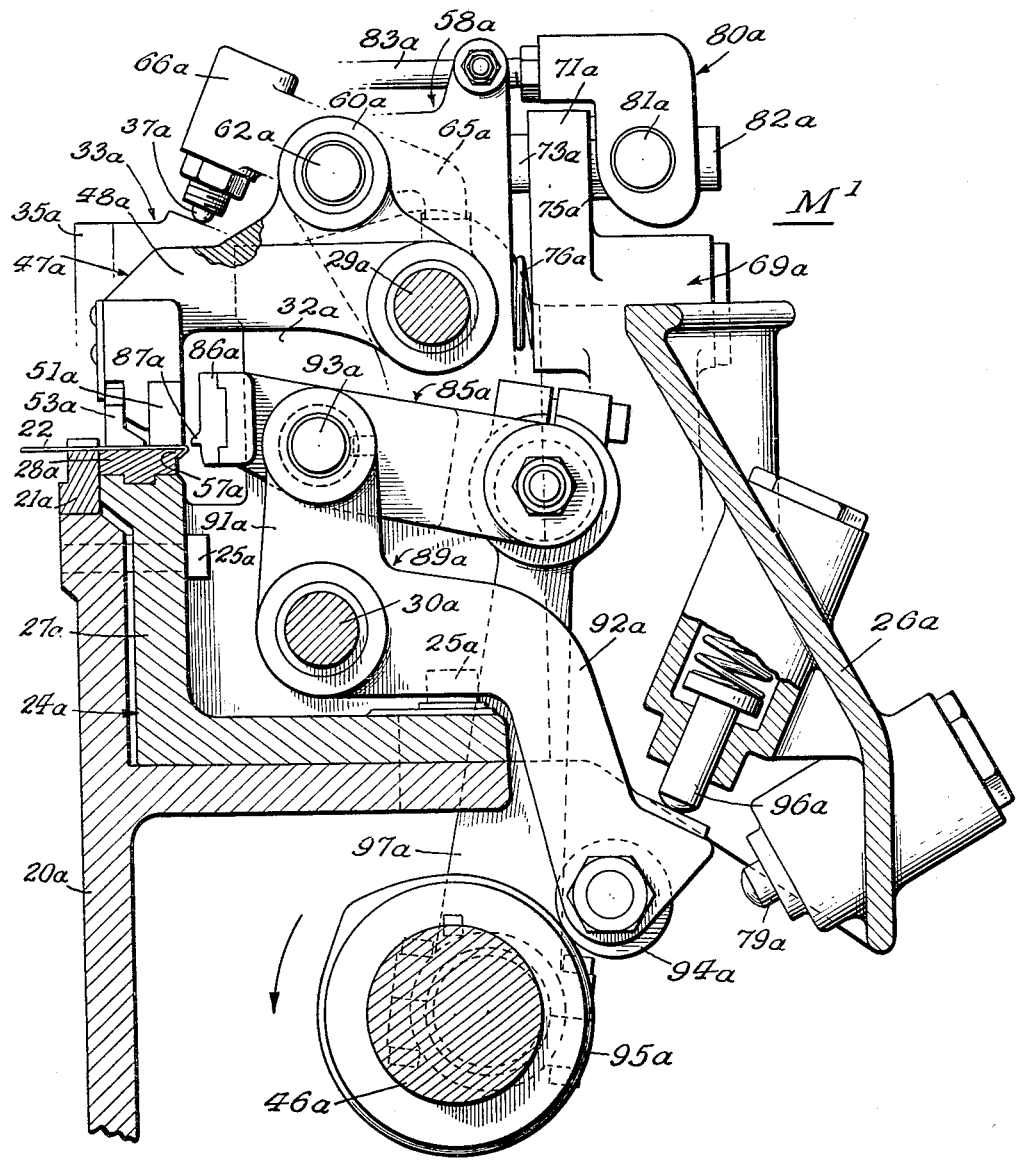

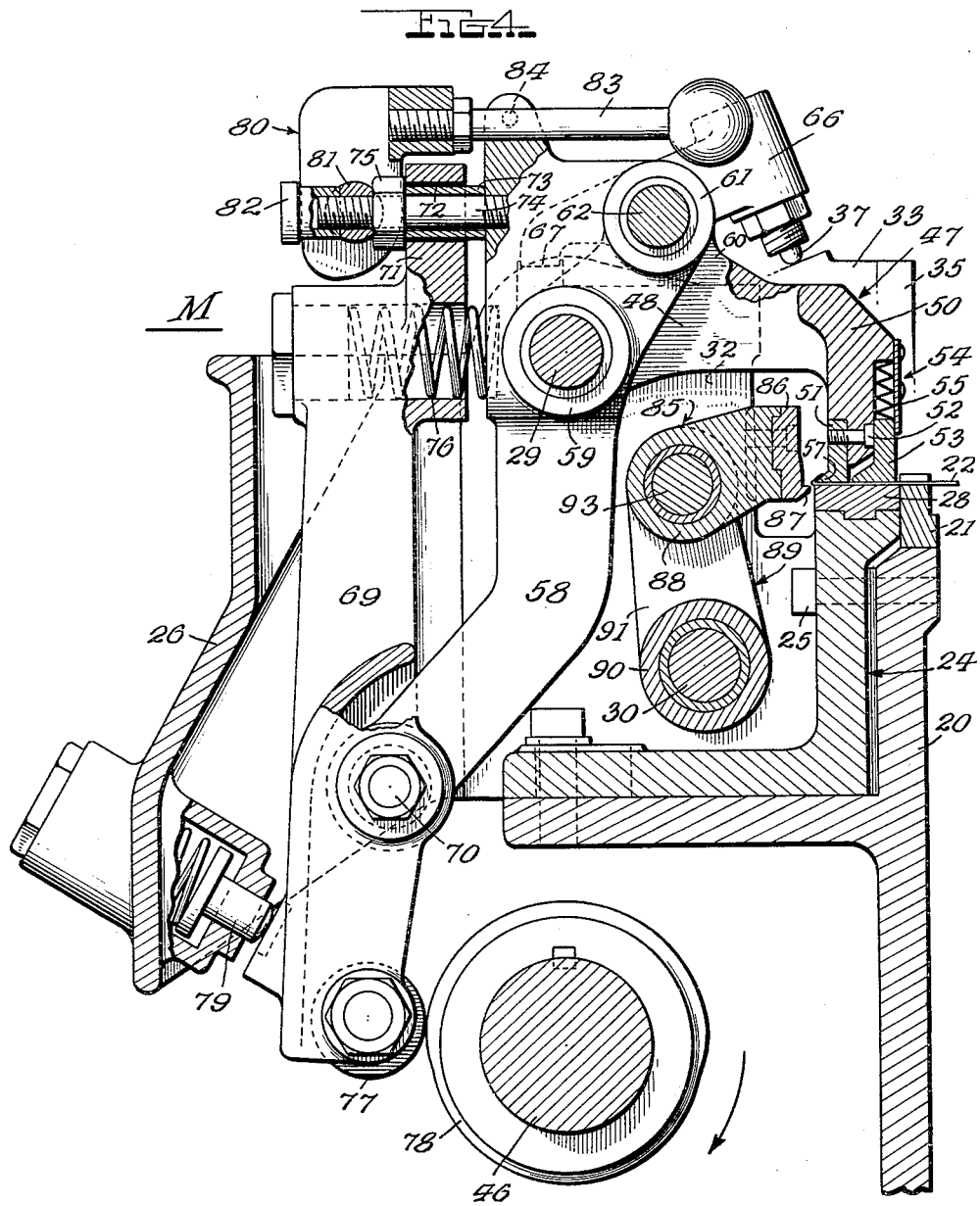

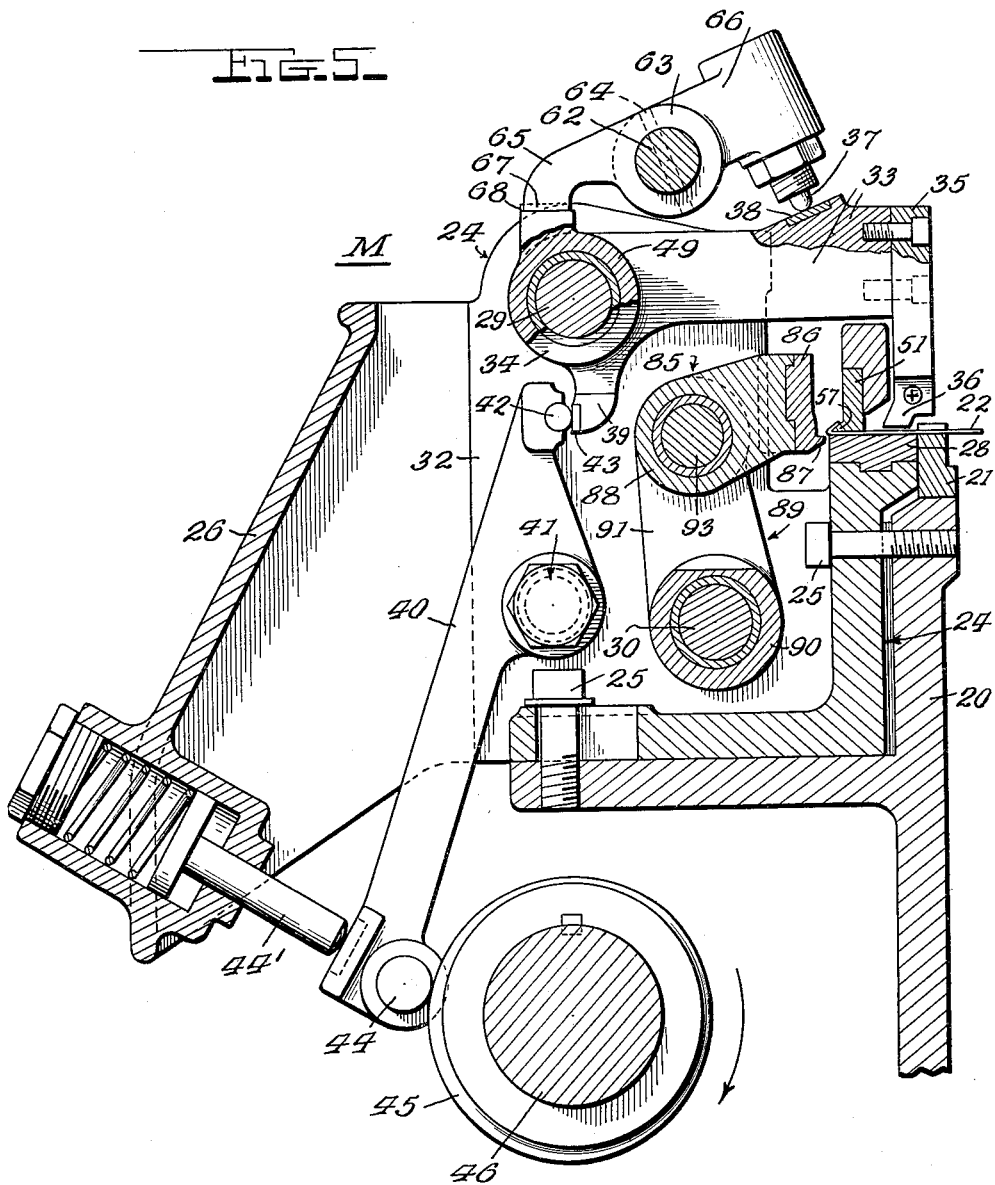

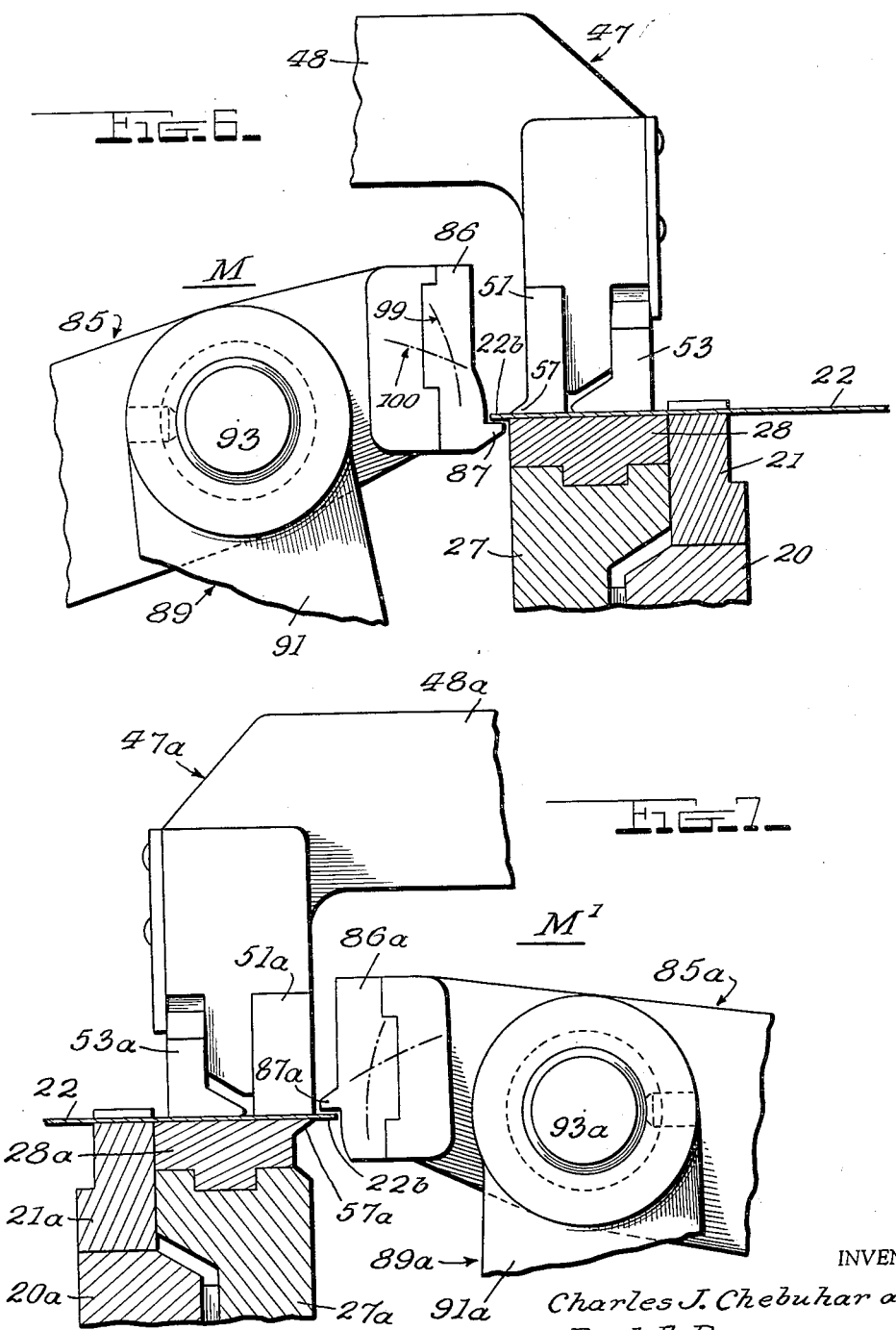

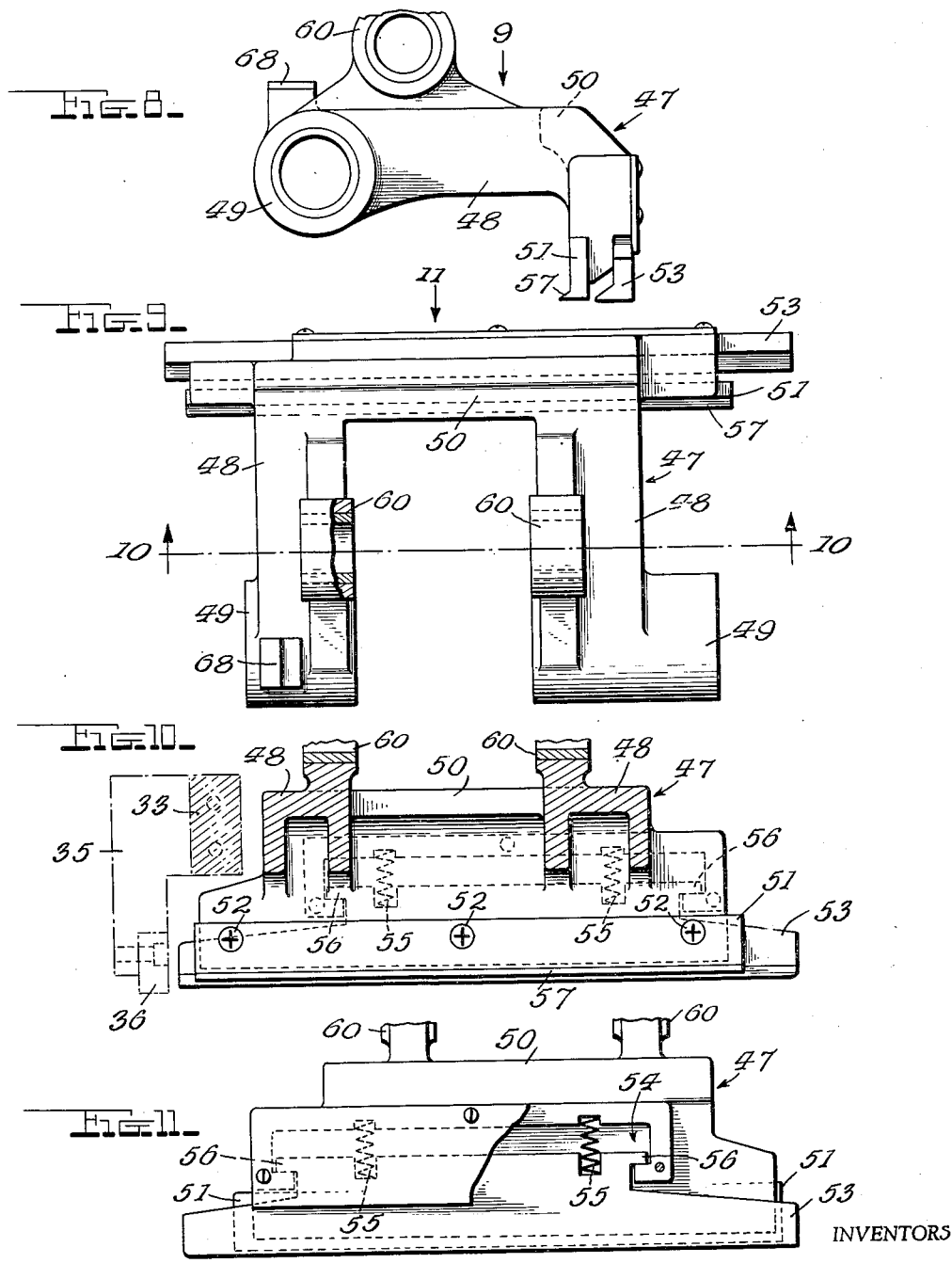

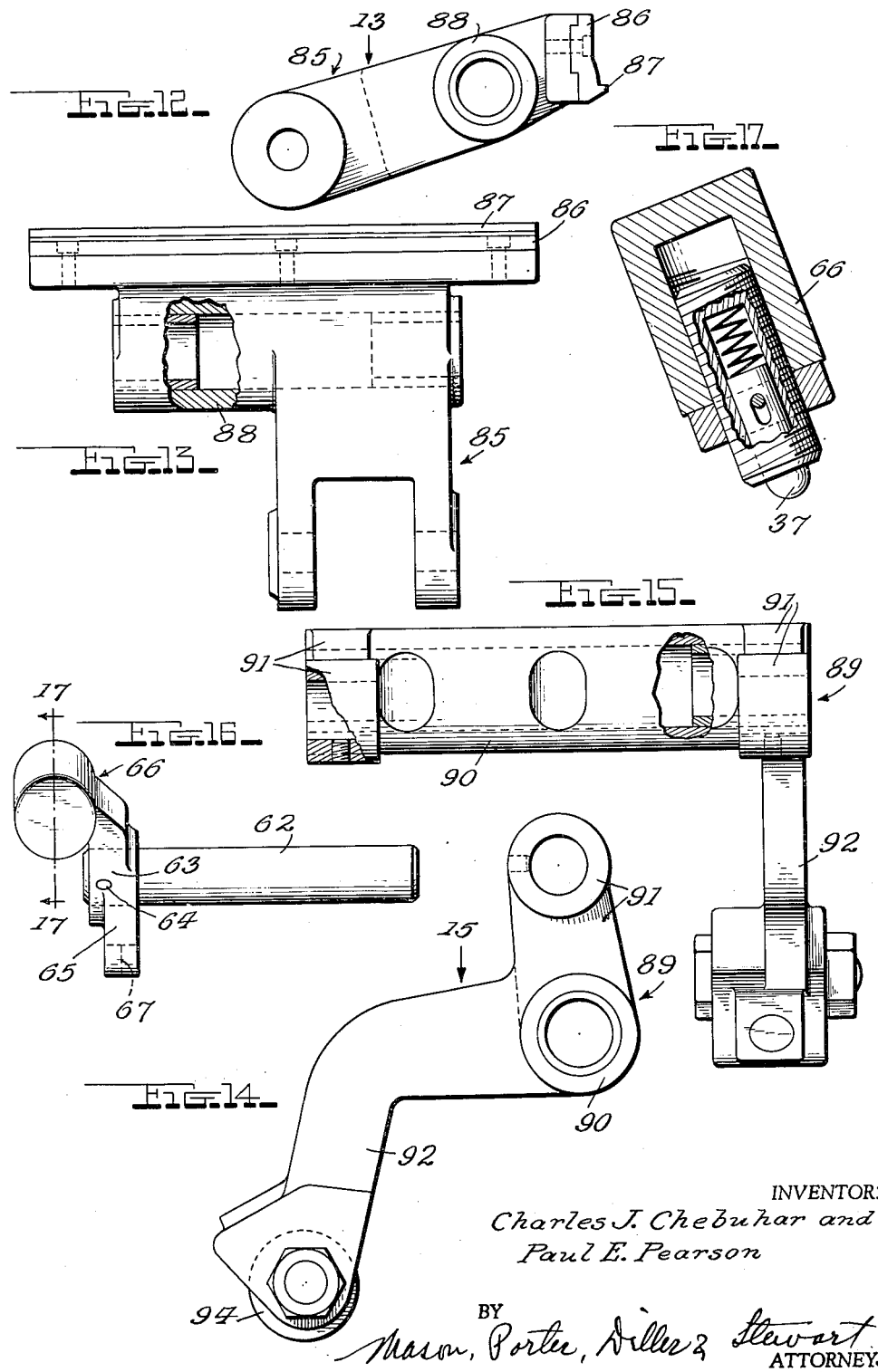

_United States Patent Office_ 3,058,512
Patented Oct. 16, 1962

3,058,512
BODY BLANK FLANGING MECHANISM
Charles J. Chebuhar, Chicago, Ill., and Paul E. Pearson, La Jolla, Calif., assignors to Continental Can Company, Inc., New York, N.Y., a corporation of New York
Filed Feb. 20, 1957, Ser. No. 641,333
20 Claims. (Cl. 153—16)

This invention relates generally to mechanisms in which flat sheet metal blanks are successively presented at a blank shaping station and fixedly clamped at said station while blank bending or other operations are being performed.

More specifically, the invention relates to a novel mechanism which bends opposite edges of each clamped blank into the form of hook flanges to interengage each other when the flanged blank is later bent into cylindrical shape.

Still more specifically, the invention relates to a novel mechanism in which the blanks are intermittently advanced along a horizontal path and successively presented at a blank flanging station, said mechanism having stop means for arresting each blank presented to said station, clamping means for fixedly clamping each arrested blank, and flanging means for forming the hook flanges on each clamped blank. This specific mechanism is therefore well adapted for and finds its principal use in machines, known as body makers, employed in the construction of metal can bodies having side seams embodying interlocked hook flanges soldered together.

The invention has aimed to generally improve upon prior mechanisms by providing an unusually simple and compact construction capable of operating rapidly, smoothly and efficiently.

The mechanism for forming one of the hook flanges on each blank is located at the left side of the elongated frame of the body maker, and a corresponding mechanism is located at the right side of said frame. Each of these mechanisms includes blank stop means, blank clamping means, and blank flanging means: and another object has been to utilize two constantly driven shafts, one at the left of the machine and the other at the right, for actuating all operating elements for said left and right mechanisms, respectively.

Another object has been to provide a housing for the various elements at each side of the machine and to utilize said housing to support a plurality of shafts upon which a number of said elements are pivotally mounted.

Yet another object has been to provide the housing with an upwardly open upper portion, and to provide a novel construction permitting manual upward swinging of the upper blank clamping member through said open portion of the housing, to aid in removing any blank which may become jammed.

A further object has been to provide a novel construction permitting manual upward swinging of the blank stop through the aforesaid open portion of the housing, to further aid in the removal of a jammed blank.

A still further object has been to provide novel operating means for an upper, upwardly and downwardly swingable blank clamp member, said operating means including a yieldable element to prevent injury in case a jammed blank should prevent full descent of said clamp member or should exert upward pressure thereon.

Another object has been to provide a manually releasable connection between the upper swingable clamp member and an adjacent operating element for said clamp member, permitting freeing of said clamp member from said operating element and allowing manual upward swinging of said clamp member to aid in the removal of a jammed blank.

Another object has been to coaxially pivot the upper clamp member and the adjacent operating element and to provide the aforesaid manually releasable connection in the form of a withdrawable pin parallel with the pivotal axis of said clamp member and operating element.

Still another object has been to provide the upper clamp member of U-shaped form, to provide the aforesaid operating element in the form of an arm extending between the side arms of the U-shaped clamp member, to pivotally mount the three arms on a single fixed shaft, and to provide said three arms with openings through which the aforesaid withdrawable pin extends.

Yet another object has been to provide the upper clamp member and the aforesaid withdrawable pin with cooperable detents for holding said pin against accidental withdrawal, to provide spring means acting on said pin in a direction to yieldably hold said detents engaged, and to utilize said spring means to depress a blank stop to operative position.

A further object has been to make novel provision for relieving friction on the withdrawable pin when this pin is to be withdrawn.

A still further object has been to provide blank clamping means having an upper clamp bar to lie longitudinally on an edge portion of the blank and a lower clamp bar to longitudinally underlie said edge portion, to provide one of said clamp bars with a longitudinal forming rib around which to bend the blank edge into hook form, to provide a bending member having a longitudinal bending rib cooperable with said forming rib in bending the blank edge, and to provide in a novel manner for imparting up and down, and in and out movements to said bending member, to effect the desired cooperation between the aforesaid forming and bending ribs.

Another object has been to pivotally mount the bending member on a tiltable support, to provide for tilting this support toward and from the blank clamping means, and to provide for swinging said bending member upwardly and downwardly to thereby impart the necessary in and out, and up and down movements to the bending bar.

Yet another object has been to make novel provision for tilting the aforesaid tiltable support by means of a rotary cam, and to make novel provision for vertically swinging the bending member by means of an eccentric on the same shaft with said cam.

A further object has been to provide a novel blank stop arm swung upwardly in releasing direction by mechanically operated means depressed to operative position by spring means, and upwardly swingable manually to an abnormal position to aid in removing a jammed blank when freed from said spring means.

With the above and other objects in view that will hereinafter appear, the nature of the invention will be more clearly understood by reference to the following detailed description, the appended claims and the several view illustrated in the accompanying drawings.

In the drawings:

FIGURES 1 and 1A jointly disclose a top plan view showing the improved mechanisms at the left and right sides of the machine frame, the outer housing walls being removed.

FIGURE 2 is a side elevation of the left hand mechanism, as indicated by the arrow 2 of FIGURE 1.

FIGURES 3 and 3A jointly disclose a transverse sectional view substantially on line 3—3A of FIGURE 2 and show both the left and right hand mechanisms, respectively. These views illustrate principally the flange bending means and cooperating portions of the blank clamping means, and the operating mechanism for said bending means and some of the machine elements beyond the plane of the section are "faded out" to avoid confusion thereof with said principal illustration.

FIGURE 4 is a transverse sectional view of the left hand mechanism, substantially on line 4—4 of FIGURE 2. This view illustrates principally the blank clamping means and its operating mechanism; and portions of the blank stop means beyond the planes of the section are "faded out" to avoid confusion thereof with said principal illustration.

FIGURE 5 is a transverse sectional view of the left hand mechanism, substantially on line 5—5 of FIGURE 2, showing primarily the blank stop means and its operating mechanism.

FIGURE 6 is a view duplicating a portion of FIGURE 3 on an enlarged scale to better illustrate the elements which cooperate in upwardly bending the hook flange on the left hand edge of the blank.

FIGURE 7 is a similar view duplicating a portion of FIGURE 3A on an enlarged scale to better illustrate the elements which cooperate in downwardly bending the hook flange on the right hand edge of the blank.

FIGURE 8 is an end elevation of the upper left hand clamp member.

FIGURE 9 is a top view of the same clamp member as indicated by the arrow 9 of FIGURE 8.

FIGURE 10 is a vertical sectional view of the same clamp member on line 10—10 of FIGURE 9, and by broken lines illustrating the relation of this member with the blank stop.

FIGURE 11 is a side elevation partly broken away and showing the same clamp member, as indicated by the arrow 11 of FIGURE 9.

FIGURE 12 is an end elevation of the left hand bending member.

FIGURE 13 is a top plan view of the same bending member, as indicated by the arrow 13 of FIGURE 12.

FIGURE 14 is an end elevation of the tiltable supporting member for the left hand bending member.

FIGURE 15 is a top view of this same tiltable supporting member, as indicated by the arrow 15 of FIGURE 14.

FIGURE 16 is a top view of the withdrawable pin and elements secured thereto.

FIGURE 17 is an enlarged sectional view on line 17—17 of FIGURE 16, partly in elevation.

The embodiment of the invention disclosed in the drawings will be rather specifically described but attention is invited to the possibility of making variations within the scope of the invention.

The invention is shown associated with a horizontally elongated frame of a body maker, the two longitudinal side bars of said frame being shown at 20 and 20a. Reciprocatory feed bars 21 and 21a are shown for intermittently advancing the body blanks 22 along the frame and successively presenting them at a blank flanging station S, the direction of feed being indicated by the arrows 23 of FIGURES 1 and 1A. One illustrative blank 22 is represented in broken lines in these two views as having edge portions 22a to form lap portions of a can body seam and as having intervening edge portions 22b to form lock portions of the seam. The present invention bends these edge portions 22b into the form of hook flanges for interengagement with each other when the blank is, at another station of the body maker, bent into cylindrical form.

To accomplish the two flanging operations, one mechanism M is provided at the left hand side of the machine frame for bending one hook flange upwardly; and a corresponding mechanism M' is provided at the right hand side of said frame for bending the other flange downwardly. These two mechanisms M and M' are substantial duplicates except for minor differences required by the necessity of bending the two hook flanges in opposite directions. Therefore, detailed illustration and description of one of these mechanisms, plus illustration and explanation of the differences, will suffice.

The left hand mechanism M has been chosen for specific illustration and description but reference numbers used for the various elements of this left hand mechanism M will be formed with the exponent "a" on corresponding elements of the right hand mechanism M' in all views in which this mechanism M' appears (FIGURES 1A, 3A and 7).

A housing 24 (FIGURES 1 to 5) is disposed at the outer side of the frame side bar 20 and is secured at 25 thereto. This housing is open at its top and is provided with a removable outer wall 26. The inner wall 27 of the housing 24 carries a horizontal bar 28 disposed longitudinally at the outer side of the feed bar 21 and constituting a lower clamp bar for the blank 22. An upper horizontal shaft 29 and a lower horizontal shaft 30 extend longitudinally across the interior of the housing 24 and are secured at 31 (FIGURES 1 and 2) to the housing end walls 32, said shafts being parallel with and outwardly spaced from the wall 27 and clamp bar 28. These shafts constitute the major provision for mounting the general assembly of movable elements in the housing 24 as will later become apparent. This assembly includes stop means for arresting each blank arriving at the station S, clamp means for clamping each arrested blank, and bending means for flanging each clamped blank. As these three means operate successively in the order stated, they and their operating mechanisms will be described in this same order.

*Stop Means and Operating Mechanism*

(See FIGURES 1, 2 and 5)

An upwardly and downwardly swingable stop arm 33 is pivotally mounted at 34 on the upper shaft 29 and disposed at the inner side of one of the housing end walls 32. The free end of this stop arm 33 carries a block 35 to which a blank stop 36 is secured, said stop 36 being shown in released position in FIGURE 5. The stop arm 33 is downwardly urged to operative position by means of a spring-pressed plunger 37 (FIGURES 2, 5 and 17) which is mounted in a manner later described, said plunger acting upon a wear plate 38 inset in said arm.

The pivoted end of the stop arm 33 is provided with a downwardly projecting lug 39 (FIGURES 2 and 5) against which the upper end of a lever 40 thrusts to swing said stop arm upwardly to released position. The lever 40 is disposed substantially vertically and is fulcrumed at 41, near its upper end, to one of the housing end walls 32, and the upper end of said lever is disposed at the side of the lug 39 remote from the free end of the arm 33. The lever 40 is provided with a hardened rocker 42 (FIGURE 5) and the lug 39 with a wear plate 43 contacting with said rocker.

The lower end of the lever 40 has a cam follower 44 cooperable with a cam 45 which moves said lever in a direction to upwardly swing the stop arm 33 to released position. This cam 45 is secured to a longitudinal constantly driven shaft 46; and the follower 44 is held against said cam by a spring pressed pin 44' carried by the housing wall 26.

The spring pressed plunger 37 is so mounted that it may be manually freed from engagement with the stop arm 33 as later explained; and when this is done, said stop arm may be manually swung upwardly to an abnormal position to aid in giving access to any blank which may become jammed. During such manual upward swinging of the arm 33, the lug 39 of this arm merely moves away from the coacting upper end of the lever 40.

*Clamping Means and Operating Mechanism*

(FIGURES 1, 2, 4 and 8 to 11)

An upper substantially horizontal, vertically swingable clamp arm 47 is pivotally mounted on the upper shaft 29 and is of U-shape in top view. The two side arms 48 of this U-shaped clamp member, have bearings 49 mounted on shaft 29, and the arm-connecting portion 50 of this clamp member carries an upper clamp bar 51 which is secured thereto at 52, said upper clamp bar 51 being unidirectional with the above mentioned lower clamp bar 28. The arm-connecting portion 50 also carries a second blank engaging bar 53 which is mounted in the manner best shown in FIGURES 4 and 11. The upper portion of this bar 53 is slidably connected at 54 with the clamp member portion 50, to allow slight vertical sliding of said bar 53. Springs 55 are employed exerting a downward pressure on said bar 53, and stops 56 are provided to limit the downward movement of this bar. When these stops function (clamp member 47 raised) the lower edge of the clamp bar 53 is slightly below the lower edge of the clamp bar 51 as seen in FIGURES 8, 10 and 11. Thus, when the clamp member 47 is again lowered, the blank will be successively engaged by the two clamp bars. The elements are preferably so related that the bar 53 will be frictionally engaged by the blank 22 as the latter arrives at the flanging station S, the clamp arm 47 being then in its raised position. The blank will thus be held in proper position for clamping before the clamping operation occurs.

The clamp bar 51 is cooperable with the flange bending means, later described, and is provided with a longitudinal forming rib 57 (FIGURES 1, 4 and 8 primarily) around which to bend the blank edge to form the upturned hook flange on the blank.

A substantially vertical actuating arm 58 (FIGURES 1, 2 and 4) is provided near its upper end with a bearing 59 which is pivotally mounted on the shaft 29 between the bearings 49 of the clamp arm 47. The side arms 48 of this clamp arm 47 have aligned upstanding pin bearings 60, and the actuating arm 58 has a pin bearing 61 aligned with said pin bearings 60. A pin 62 extends through the aligned pin bearings 60 and 61 and thus so connects the clamp member 47 with the actuating arm 58 that movements of said actuating arm 58 will be imparted to said clamp member 47.

The pin 62 is withdrawable to free the clamp member 47 from the actuating arm 58, thereby allowing manual upward swinging of said clamp member 47 to an abnormal position to aid in giving access to a jammed blank. It will be recalled that the stop arm 33 is also similarly swingable when freed from the action of the spring-pressed plunger 37. Coacting detents are provided on the pin 62 and the clamp member 47 for normally holding said pin 62 against withdrawal, said detents being held in operative engagement as long as a turning force is exerted in one direction on said pin 62. The spring-pressed detent 37 is mounted on this pin 62 and utilized to exert said turning force. Thus, by manually turning the pin 62 against the action of the spring-pressed plunger 37, the coacting detents are disengaged and said pin may be withdrawn; and during its withdrawal the pin carries said spring-pressed plunger from engagement with the stop arm 33. Manual upward swinging of both this stop arm and the clamp member 47 is thus made possible for the purpose of removing a jammed blank.

In the present disclosure, the end of the pin 62 toward the stop arm 33 is provided with a head 63 as seen in FIGURES 1, 2, 5 and 16, said head being pinned at 64 to said pin 62. The head 63 has two oppositely projecting arms 65 and 66. The arm 65 has a detent 67 coacting with another detent 68 on one of the bearings 49 of the clamp member 47, to hold the pin 62 against withdrawal as long as a turning force is exerted on said pin 62 in a direction to hold the detents 67 and 68 engaged. The spring-pressed plunger 37 is adjustably mounted in the arm 66 as seen in FIGURE 17 and supplies this turning force. Manual depression of the arm 66 disengages the detents 67 and 68 and allows withdrawal of pin 62 and the withdrawal of this pin moves the plunger 37 from the stop arm 33. Manual upward swinging of both this stop arm and the clamp member 47 is thus permitted.

Spaced outwardly from the side of the actuating arm 58 remote from the clamp member 47, there is a substantially upright lever 69 (FIGURES 1, 2 and 4 primarily). This lever is pivoted at 70 to the lower end of the actuating arm 58. The upper end of the lever 69 has an upstanding lug 71 (FIGURE 4) formed with an opening 72 through which a sleeve 73 extends slidably. A stud 74 projects from the upper end portion of the actuating arm 58 through the sleeve 73, and a nut 75 is threaded on said stud 74. The outer end of the sleeve 73 abuts this nut 75 and the inner end of said sleeve abuts the arm 58.

A coiled compression spring 76 (FIGURE 4) is carried by the upper end portion of the lever 69 and abuts the actuating arm 58. While this spring tends to more widely separate the lever 69 from the arm 58, such tendency is resisted by the nut 75 which abuts the level lug 71.

The lower end of the lever 69 has a cam follower 77 engaged by a cam 78 on the shaft 46, said follower being held against said cam by a spring-pressed pin 79. Normally, when the cam 78 operates the lever 69, this lever, the spring 76, the arm 58 and the clamp member 47 rock as a single unit to engage the clamp bar 51 with the blank 22. However, should the blank be jammed, and prevent full descent of the clamp bar 51, or should a jammed blank exert an upward force on said clamp bar 51, the spring 76 will yield and prevent injury to parts.

As the spring 76 causes quite an amount of friction between the withdrawable pin 62 and the pin bearings 60 and 61, provision is made for relieving this friction when said pin 62 is to be withdrawn. For this purpose, a manually operable cam lever 80 is fulcrumed on a pin 81 mounted on the outer end of the stud 74 and clamped against the nut 75 by means of another nut 82. The handle 83 of the cam lever 80 is normally held in idle position by spring-pressed detents 84 best seen in FIGURES 1 and 4, but when this handle is swung upwardly, the cam lever 80 pulls on the stud 74 and pushes on the lever lug 71, thereby relatively moving the lever 69 and the actuating arm 58 to relieve the friction on the pin 62, permitting easy withdrawal of this pin.

*Flange Bending Means and Actuating Mechanism*
(FIGURES 2, 3 and 12 to 15)

An upwardly and downwardly swingable bending member 85 is provided in the general form of a lever. This bending member 85 has a longitudinal bending bar 86 parallel with the clamp bars 28 and 51, said bending bar being formed with a longitudinal bending rib 87 for bending the blank edge around the forming rib 57 of said clamp bar 51. Between its ends, the bending member 85 has a fulcrum sleeve 88, the axis of which is parallel with the bending bar 86.

A tiltable supporting member 89, in the general form of a lever, is provided for the bending member 85. This supporting member 89 has a fulcrum sleeve 90 mounted on the shaft 30, two upstanding arms 91 on the ends of said fulcrum sleeve 90, and an angular lever arm 92 on one end of said fulcrum sleeve 90. The fulcrum sleeve 88 of the bending member 85 extends between the upper ends of the arms 91, and a fulcrum pin 93 is secured to said arms 91 and received in said fulcrum sleeve 88.

The lower end of the lever arm 92 has a cam follower 94 engaged by a cam 95 on the shaft 46, said follower being held against said cam by a spring-pressed pin 96. The outer end of the bending member 85 is connected by a connecting rod 97 with an eccentric 98 on the shaft 46.

The eccentric 98 and connecting rod 97 operate the bending member 85 to impart alternate up and down movements to the bending bar 86 on an arc 99 (FIGURE 6) about the pivot pin 93. The cam 95 actuates the tiltable supporting member 89 to move the bending bar 86 alternately in and out with respect to the blank, on an arc 100 (FIGURE 6) about the shaft 30. These up and down, and in and out movements combine to bend the blank edge around the forming rib 57, thereby forming an upwardly and inwardly projecting hook flange on the left edge of the blank. The right hand edge of the blank is bent by the mechanism M' to provide a downwardly and inwardly bent hook flange as now explained with reference primarily to FIGURES 3A and 7.

The right hand mechanism M' has the bending rib 57a on the lower clamp bar 28a instead of the upper bar 51a, and the bending rib 87a of the bending bar 86a is positioned to push downwardly on the blank edge instead of upwardly. Otherwise, the left and right mechanisms M and M' are substantial duplicates as above stated.

From the foregoing, it will be seen that novel and advantageous construction has been disclosed for attaining the desired ends, and while preferences have been disclosed, attention is again invited to the possibility of making variations.

If the invention is to be employed for flanging blanks for can bodies having side seams in which one or more lap portions are provided between the seam ends, it is to be understood that the bending ribs 87 and 87a must be interrupted wherever no hook flanges are required.

We claim:

1. A machine having an elongated horizontal frame member, feed means for intermittently advancing body blanks along said frame and successively presenting the body blanks at a single blank flanging station, stop means at said station for arresting each blank advanced thereto by said feed means, clamping means at said station for clamping each arrested blank, flanging means at said station for flanging each clamped blank, three operating mechanisms connected respectively with said stop means, said clamping means and said flanging means, a driven shaft extending longitudinally of said frame, said shaft having actuating elements for said three operating mechanisms respectively, a housing secured to said frame, said housing containing at least major portions of said stop means, and clamping means, said flanging means and said operating mechanisms, said housing having an upwardly open upper portion, said clamping means including a pivoted clamping member upwardly swingable through said open portion of said housing to aid in removing a jammed blank, said clamping means operating mechanism including an operating lever pivoted coaxially with said pivoted clamping member, and a readily withdrawable pin extending through and releasably fixedly connecting said pivoted clamping member to said operating lever for actuation thereby.

2. In a machine having an elongated horizontal frame along which body blanks are intermittently advanced and successively presented at a single blank flanging station, stop means at said station for arresting each blank advanced thereto, clamping means at said station for clamping each arrested blank, flanging means said station for flanging each clamped blank, three operating mechanisms connected respectively with said stop means, said clamping means and said flanging means, a driven shaft extending longitudinally of said frame, said shaft having actuating elements for said three operating mechanisms respectively, a housing secured to said frame, said housing containing at least major portions of said stop means, said clamping means, said flanging means and said operating mechanisms, said housing having an upwardly open upper portion, said stop means including a pivoted member upwardly swingable beyond a normal operating position and through said open portion of said housing to aid in removing a jammed blank, and said pivoted member having means normally resiliently urging said stop means to an operative position.

3. In a machine having an elongated horizontal frame along which body blanks are intermittently advanced and successively presented at a single blank flanging station, stop means at said station for arresting each blank advanced thereto, clamping means at said station for clamping each arrested blank, flanging means at said station for flanging each clamped blank, three operating mechanisms connected respectively with said stop means, said clamping means and said flanging means, a driven shaft extending longitudinally of said frame, said shaft having actuating elements for said three operating mechanisms respectively, a housing secured to said frame, said housing containing at least major portions of said stop means, said clamping means, said flanging means and said operating mechanisms, said housing having an upwardly open upper portion, said clamping means including a pivoted clamping member upwardly swingable through said open portion of said housing to aid in removing a jammed blank, said clamping means operating mechanism including an operating lever pivoted coaxially with said pivoted clamping member, and a readily withdrawable pin extending through and releasably connecting said pivoted clamping member to said operating lever for actuation thereby, said stop means including a pivoted member also upwardly swingable beyond a normal operating position and through said open portion of said housing to further aid in removing a jammed blank, and said pivoted member having means normally resiliently urging said stop means to an operative position.

4. In a can body maker wherein are included means for successively presenting body blanks at a station whereat hooks are formed on the blanks, means for stopping the blanks at said station, means for clamping the blanks at said station, and means for forming hooks on the blanks at said station, said clamping means including a fixed lower clamp element disposed at said station in position to underlie a blank, an upwardly and downwardly swingable clamp member having an upper clamp element positioned to overlie the blank, means pivotally mounting said clamp member on an axis parallel with and spaced outwardly from said clamp elements, operating means for said clamp member including a pivotally mounted element near said clamp member, means for pivoting said pivotally mounted element about a single axis, and a releasable rigid operating connection fixedly connecting said pivotally mounted element and said clamp member for unitary movement, said clamp member being upwardly swingable by hand to an out-of-the-way position, when said operating connection is released, to give access to a damaged blank.

5. A structure as specified in claim 4, in which the pivot of said clamp element and the pivot of said pivotally mounted element are coaxial.

6. A structure as specified in claim 4 in which said releasable operating connection comprises a pin parallel with the pivotal axes of said clamp member and said pivotally mounted element, said clamp member and said pivotally mounted element having openings receiving said pin and allowing withdrawal thereof, and releasable means normally holding said pin against withdrawal.

7. A structure as specified in claim 4 in which said means for pivoting said pivotally mounted element includes a yieldable element to prevent machine damage if an injured blank prohibits normal downward movement of said clamp member.

8. In a can body maker wherein are included means for successively presenting body blanks at a station whereat hooks are formed on the blanks, means for stopping the blanks at said station, means for clamping the blanks at said station, and means for forming hooks on the blanks at said station, said clamping means including a fixed lower clamp element disposed at said station in position to underlie a blank, an upwardly and downwardly swingable clamp member having an upper clamp element positioned to overlie the blank, means pivotally mounting said clamp member on an axis parallel with and spaced outwardly from said clamp elements, a substantially vertical arm having its upper end portion pivotally mounted on an axis unidirectional with the pivotal axis of said clamp member, said arm and clamp member being operatively connected for joint pivotal movement, a substantially vertical lever at the side of said arm remote from said clamp member, the lower end of said lever being provided with a cam follower, a pivot connecting the lower end of said arm with said lever, a yieldable connection between said lever and said arm and exerting a force tending to swing the upper end of said lever outwardly from the upper end of said arm, arm-and-lever-connecting means prohibiting said outward swinging of said upper end of said lever, said arm-and-lever-connecting means being constructed and arranged to permit said upper end of said lever to move toward said upper end of said arm, and a cam engaging the aforesaid cam follower, said cam being operable to move said lever, said arm and said clamp in blank-clamping direction, said yieldable connection preventing machine injury if a jammed blank should prohibit full downward swing of said clamp member.

9. A structure as specified in claim 8 in which said clamp member and said arm are pivoted on a common axis and in which the operative connection between said arm and said clamp member comprises a withdrawable pin parallel with said common axis, permitting manual upward swinging of said clamp member to give access to a jammed blank.

10. A structure as specified in claim 8 in which said clamp member and said arm are pivoted on a common axis and in which the operative connection between said arm and said clamp member comprises a withdrawable pin parallel with said common axis, permitting manual upward swinging of said clamp member to give access to a jammed blank; and manually operable means associated with said arm and lever for relatively moving them to relieve friction on said withdrawable pin when the latter is to be withdrawn.

11. A structure as specified in claim 8, in which said clamp member and said arm are pivoted on a common axis; the operative connection between said arm and clamp member comprising a withdrawable pin parallel with said common axis and permitting manual upward swinging of said clamp member when said pin is withdrawn to give access to a jammed blank; said arm-and-lever-connecting means comprising a stud secured to the upper end of said arm and projecting through an opening in the upper end of said lever, a fixed stop on said stud and abutting the side of said lever remote from said arm, and a sleeve surrounding said stud and extending slidably through said lever opening, the ends of said sleeve abutting said arm and said stop respectively; and a manually operable cam lever mounted on the outer end of said stud, said cam lever being engageable with said lever for relatively moving said lever and arm to relieve friction on said pin when the latter is to be withdrawn.

12. In a can body maker wherein are included means for successively presenting body blanks at a station whereat hooks are formed on the blanks, means for stopping the blanks at said station, means for clamping the blanks at said station, and means for forming hooks on the blanks at said station, said clamping means including a fixed lower clamp element disposed at said station in position to underlie a blank, an upwardly and downwardly swingable clamp member having an upper clamp element positioned to overlie the blank, means pivotally mounting said clamp member on an axis parallel with and spaced outwardly from said clamp elements, operating means for said clamp member including an element pivotally mounted coaxially with said clamp member, a withdrawable pin connecting said element and said clamp member; said pin being parallel with the pivotal axis of said element and clamp member, a pin-holding member secured to one end of said pin, said pin-holding member and said clamp member having coating detent portions for holding said pin against withdrawal until said pin is turned in a direction to disengage said detent portions, a pivoted blank stop arm near said one end of said pin, and spring-pressed means acting downwardly on said blank stop arm and reacting on said pin in a direction to yieldably resist turning of said pin in detent releasing direction.

13. In a can body maker wherein are included means for successively presenting body blanks at a station whereat hooks are formed on the blanks, means for stopping the blanks at said station, means for clamping the blanks at said station, and means for forming hooks on the blanks at said station, said clamping means including an upper clamp member of U shape in top view, the free ends of the side arms of said clamp member having two aligned pivot bearings, said side arms also having two aligned pin bearings between their ends, the arm-connecting portion of said clamp member having downwardly exposed blank engaging means, an operating element having a pivot bearing between and aligned with the aforesaid two pivot bearings, said operating element also having a pin bearing between and aligned with the aforesaid two pin bearings, a pivot shaft extending through the three aligned pivot bearings, and a withdrawable pin extending through the three aligned pin bearings and rigidly connecting together said clamp member and said operating element for movement in unison.

14. In a can body making machine in which body blanks are successively presented at a blank flanging station, blank clamping means including a fixed lower clamp bar disposed longitudinally at said station in position to underlie an edge portion of a blank, said blank clamping means also including an upper clamp bar disposed longitudinally at said station in position to overlie said edge portion of the blank, one of said clamp bars having a longitudinal forming rib around which to bend the blank edge into the form of a hook flange; a bending bar outwardly spaced from and parallel to said clamp bars, said bending bar having a longitudinal bending rib for bending the blank edge around said forming rib, an upwardly and downwardly swingable member to which said bending bar is secured, said upwardly and downwardly swingable member being disposed outwardly of said clamp bars, a tiltable supporting member upon which said upwardly and downwardly swingable member is pivotally mounted on an axis parallel with and outwardly spaced from said bending bar, means tiltably mounting said tiltable supporting member on an axis parallel with and vertically spaced from the aforesaid axis, operating means connected with said tiltable supporting member for alternately swinging this member toward and from said clamping bars to thereby alternately move said upwardly and downwardly swingable member and said bending bar in and out with respect to said clamping bars, and operating means connected with said upwardly and downwardly swingable member for alternately swinging this member upwardly and downwardly to thereby cause alternate up and down movements of said bending bar, said in and out movements and said up and down movements of said bending bar being operative to cause the aforesaid bending bar to bend the blank edge around the aforesaid forming rib, said tiltable supporting member comprising a lever having an upstanding arm and a downwardly projecting arm; said upwardly and downwardly swingable member comprising a lever fulcrumed between its ends on said upstanding arm, the inner end of this lever being secured to said bending bar; said operating means for said tiltable supporting member comprising a cam follower on said downwardly projecting arm, a cam engaging said follower, and a driven shaft carrying said cam and disposed parallel with the aforesaid axes; said operating means for said upwardly and downwardly swingable member comprising an eccentric on said shaft and a connecting rod connecting this eccentric with the outer end of said substantially horizontal lever.

15. In a can body maker including means for successively presenting blanks at a blank flanging station, a pivoted substantially horizontal stop arm disposed at said station and having a downwardly projecting blank stop, the pivoted end of said stop arm being provided with a downwardly projecting lug, a lever abutting the side of said lug remote from said blank stop to upwardly swing said stop arm to released position, a rotary cam engaging said lever to operate the same, and spring means for depressing said stop arm to operative position when said lever permits.

16. A structure as specified in claim 15, in which said spring means is disengageable from said stop arm to allow manual upward swinging of the latter to aid in removing a jammed blank, said lug being movable away from said lever during said manual upward swinging of said stop arm.

17. In a can body making machine in which body blanks are successively presented at a blank flanging station, blank clamping means for clamping a blank adjacent an edge of the blank, said blank clamping means including a longitudinal forming rib about which to bend the blank edge into the form of a hook flange, a bending bar outwardly spaced from and parallel to said forming rib, a lever having an elongated fulcrum sleeve between its end, said fulcrum sleeve having an axis parallel with said bending bar, one end of said lever being connected to said bending bar, and means connected to the other end of said lever for pivoting said lever about the axis of said fulcrum sleeve, a tiltable support member having an intermediate fulcrum sleeve spaced downwardly from and parallel with said fulcrum sleeve of said lever, said tiltable support member having two upstanding arms at the ends of its fulcrum sleeve, said two arms being disposed at the end of said fulcrum sleeve of said lever, a fulcrum pin supported by said two arms and extending through said fulcrum sleeve of said lever, a fixedly supported second fulcrum pin extending through said fulcrum sleeve of said tiltable support member and supporting said tiltable support member for pivotal movement, said tiltable support member also including an operating arm projecting from its fulcrum sleeve, and means connected to said operating arm for tilting said tiltable support member simultaneous with and in timed relation to the swinging of said lever whereby a rocking and swinging movement of said bending bar free of straight line reciprocating forces is obtained.

18. In a can body making machine in which body blanks are successively presented at a blank flanging station, blank clamping means for clamping a blank adjacent an edge of the blank, said blank clamping means including a longitudinal forming rib about which to bend the blank edge into the form of a hook flange, a bending bar outwardly spaced from and parallel to said forming rib, an upwardly and downwardly swingable lever disposed outwardly of said clamp means, said bending bar being secured to one end of said lever, a tiltable support member in the form of a lever having an upstanding arm and a downwardly projecting arm, means tiltably mounting said tiltable support member for tilting about an axis parallel with and spaced below said bending bar, a pivot carried by the upper end of said upstanding arm and extending parallel with said bending bar, said swingable lever being fulcrumed between its ends on said upstanding arm pivot shaft, a driven shaft disposed parallel with said bending bar, operating means connecting said tiltable support member to said driven shaft for alternately swinging said tiltable support member toward and from said forming rib to thereby alternately move said swingable lever and said bending bar in and out with respect to said forming rib, and other operating means connecting the end of said swingable lever remote from said bending bar to said driven shaft for alternately swinging said swingable lever upwardly and downwardly in timed relation and simultaneous with the swinging of said tiltable support member to thereby cause up and down movements and simultaneous in and out movements of said bending bar free of straight line reciprocating movements, said in and out movements and said up and down movements of said bending bar being operative to bend the blank edge around said bending rib.

19. A structure as specified in claim 18; said operating means for said tiltable support member including a cam on said driven shaft and a cam follower on said downwardly projecting arm engaging said cam, and said other operating means including an eccentric on said driven shaft and a connecting rod connecting said eccentric with the end of said swingable lever remote from said bending bar.

20. In a can body making machine in which body blanks are successively presented at a blank flanging station, blank clamping means including a fixed lower clamp bar disposed longitudinally of said station in position to underlie an edge portion of a blank, said blank clamping means also including an upper clamp bar disposed longitudinally of said station in position to overlie said edge portion of the blank, one of said clamp bars having a longitudinal forming rib around which to bend the blank edge into the form of a hook flange; a bending bar outwardly spaced from and parallel to said clamp bars, said bending bar having a longitudinal bending rib for bending the blank edge around said forming rib, an upwardly and downwardly swingable lever having an elongated fulcrum sleeve between its ends, said bending bar being secured to one end of said lever parallel to said fulcrum sleeve, a tiltable supporting member having an intermediate fulcrum sleeve spaced downwardly from and parallel with said fulcrum sleeve of said swingable lever, said tiltable supporting member having two upstanding arms at the ends of its fulcrum sleeve, said two arms being disposed at the ends of said fulcrum sleeve of said swingable lever, a fulcrum pin carried by said two arms and extending through said fulcrum sleeve of said swingable lever, said fulcrum sleeve of said tiltable supporting member also having an operating arm projecting from its fulcrum sleeve, operating means connected with said tiltable supporting member operating arm for alternately swinging said tiltable supporting member toward and from said clamping bars to thereby alternately move said upwardly and downwardly swingable member and said bending bar in and out with respect to said clamping bars, and operating means connected with the other end of said upwardly and downwardly swingable member for alternately swinging said upwardly and downwardly swingable member upwardly and downwardly in timed relation and simultaneous with the swinging of said tiltable support member to thereby cause alternate up and down movements and simultaneous in and out movements of said bending bar free of straight line reciprocating movements, said in and out movements and said up and down movements of said bending bar being operative to cause the aforesaid bending bar to bend the blank edge around the aforesaid forming rib.

References Cited in the file of this patent
UNITED STATES PATENTS

| | | |
|---|---|---|
| 307,198 | Jordan | Oct. 28, 1884 |
| 577,458 | Solter | Feb. 23, 1897 |
| 752,949 | Black | Feb. 23, 1904 |
| 783,788 | Johnson | Feb. 28, 1905 |
| 826,807 | Slaysman | July 24, 1906 |
| 926,592 | Odquist | June 29, 1909 |
| 1,055,973 | Graham | Mar. 11, 1913 |
| 1,103,953 | Flagge | July 21, 1914 |
| 1,798,439 | Seaholm | Mar. 31, 1931 |
| 1,917,359 | Cameron | July 11, 1933 |
| 2,147,800 | Sadowski | Feb. 21, 1939 |
| 2,429,169 | Pearson et al. | Oct. 14, 1947 |
| 2,480,192 | Laxo | Aug. 30, 1949 |
| 2,487,365 | Pearson | Nov. 8, 1949 |
| 2,569,181 | Laxo | Sept. 25, 1951 |
| 2,711,576 | Wilson | June 28, 1955 |
| 2,726,702 | Laxo | Dec. 13, 1955 |